June 19, 1934.   J. W. POYSA   1,963,213
MAGNETIC MOTOR
Filed Dec. 21, 1931   2 Sheets-Sheet 1

INVENTOR:
JOHAN W. POYSA,
BY
ATTORNEY.

June 19, 1934.   J. W. POYSA   1,963,213
MAGNETIC MOTOR
Filed Dec. 21, 1931   2 Sheets-Sheet 2
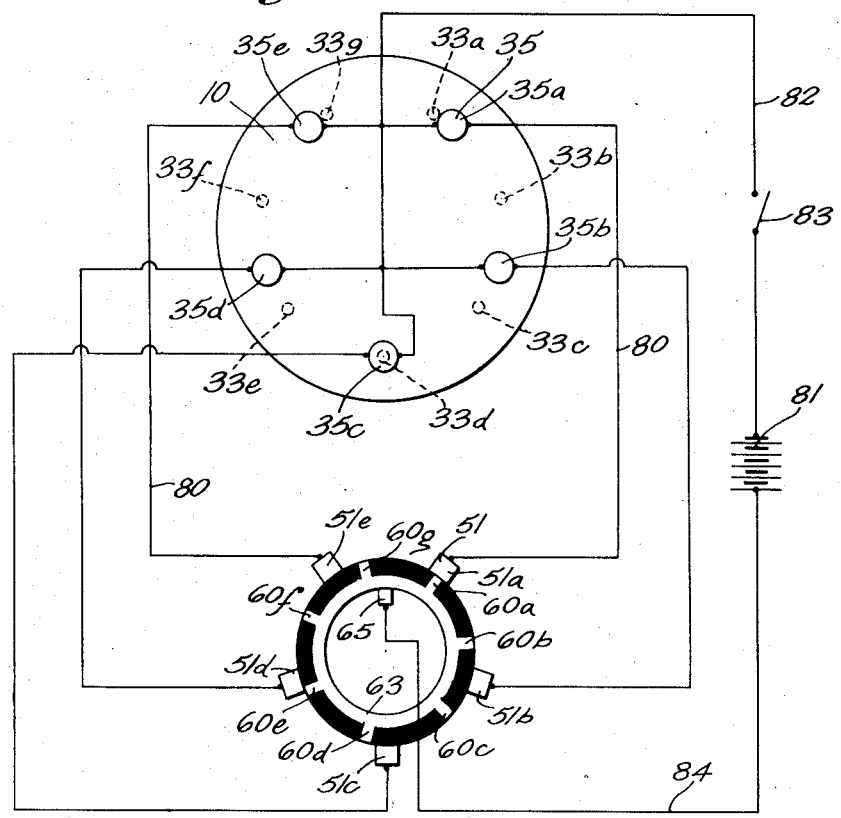
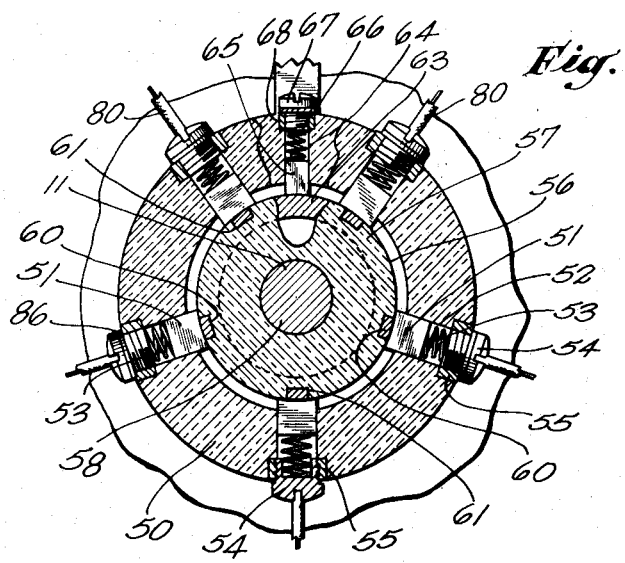

UNITED STATES PATENT OFFICE 1,963,213

MAGNETIC MOTOR

Johan W. Poysa, Hollywood, Calif.

Application December 21, 1931, Serial No. 582,231

11 Claims. (Cl. 172—36)

My invention relates to a magnetic turbine or motor of simple construction.

My invention has for an object to provide a motor including a plurality of magnetic metal bars or armatures mounted on a rotary member in such positions that they will be consecutively attracted forwardly by electromagnets mounted on a stationary frame.

It is a further object of the invention to provide a device of this character having a simple form of electric current distributing means for energizing the electromagnets of the device, such distributing means being of adjustable character and also being capable of quick reversal whereby to produce a reverse in the direction of rotation of the rotary element of the motor.

A further object of the invention is to provide a device of the above character having simple means for eliminating the air gaps between the cooperating faces of the armatures and electromagnets.

Further objects and advantages of the invention will be made evident throughout the following part of the specification.

Referring to the drawings, which are for illustrative purposes only,

Fig. 3 is an enlarged cross section on a plane represented by the line 3—3 of Fig. 2.

Fig. 4 is a diagram showing the electrical connections employed in this embodiment of my invention.

Figure 2:
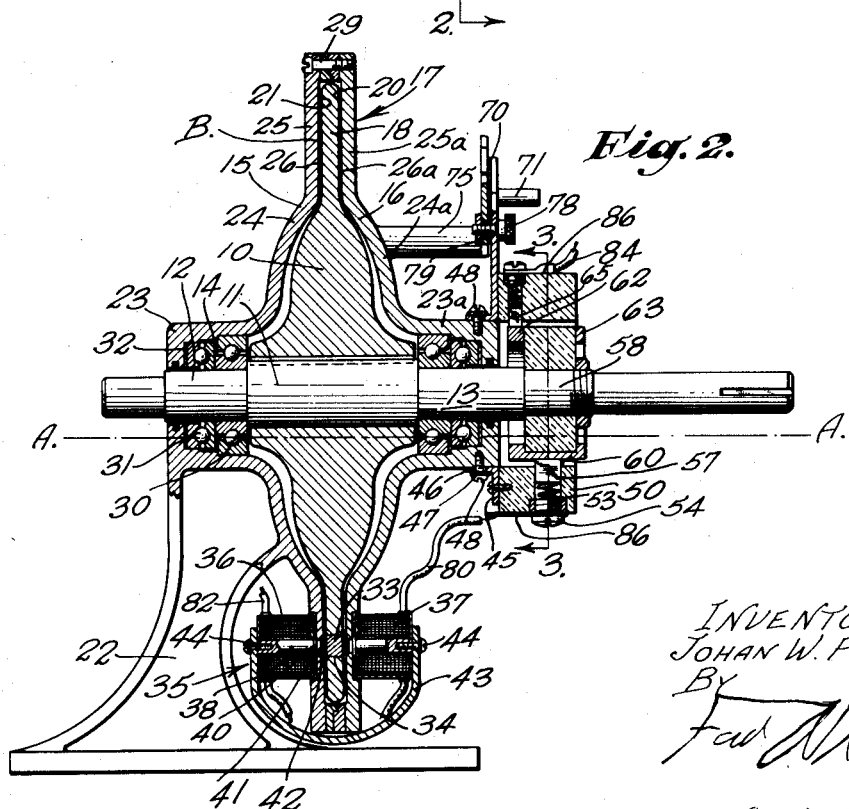
Fig. 2 is a cross section on a plane represented by the line 2—2 of Fig. 1.

In the preferred embodiment of my invention shown in the drawings I provide a rotor 10 mounted on a shaft 11 having reduced extensions 12 and 13, as shown in Fig. 2, which extend through bearing means 14 mounted in members 15 and 16 of a housing or casing 17. The rotor 10 has a radially extending flange or web 18 preferably with radially extending side edges 20 and 21. The members 15 and 16 are preferably cast from a diamagnetic material, such as aluminum or an alloy thereof. The casing member 15 includes a base 22, a bearing housing 23, and casing wall portions 24 and 25, the wall portion 25 being radial and having an inner radial face 26 which is parallel and in close proximity to the face 21 of the web 18. The casing member 16 has a bearing housing 23a and wall portions 24a and 25a, the wall portion 25a being radial and having an inner surface 26a parallel to the face 20 of the member 18. The bearings 14 are each shown as including a radial ball bearing 30 and a thrust ball bearing 31 so arranged that the rotor 10 will be accurately positioned within the casing 17, annular shims 32 being shown as means for centralizing the web 18 between the walls 25 and 25a. The casing member 16 is secured to the casing member 15 by use of screws 29 situated at the peripheries of the walls 25 and 25a.

The web 18 is formed from a diamagnetic material, such as aluminum, and armature bars 33 of paramagnetic material, such as iron, are secured in circular arrangement with the ends thereof exposed and in the planes of the faces 20 and 21 of the web 18. As shown in the drawings, the bars 33 may be secured in the web 18 by extending them through holes 34 in the web 18 and swedging or riveting the ends. Electromagnets 35 are supported by the casing 17 in circular position to cooperate with the bars 33, such electromagnets 35 including coils 36 and 37 mounted on the outer faces of the walls 25 and 25a and each having a core 38 formed with a flange 40 near its inner end and an inwardly extending portion 41 which projects through an opening 42 in a wall 25 or 25a, such inner end 41 being riveted or swedged in the opening and leaving an inner face exposed in the inner surface 26 or 26a of a respective wall portion 25 or 25a. The outer ends of each pair of cores 38 are magnetically connected by means of a magnetic bridge 43 consisting of a U-shaped bar of iron having its ends secured by screws 44 to the outer ends of the cores 38. On the cylindrical outer face of the bearing housing 23a a radially walled ring 45 is mounted, this ring having a cylindrical flange 46 with circumferentially elongated slots 47 therein through which screws 48 are extended for the purpose of securing the ring 45 to the bearing housing 23a. Concentrically mounted on the ring 45 is a cylindrical brush supporting means 50 consisting of a body of dielectric material, such as fiber or bakelite. As shown in Fig. 3, brushes 51 are supported in the inner ends of radial openings 52 and are pressed inwardly by electroconductive springs 53 which are retained by screws 54 threaded into rings 55 which are set into the outer ends of the radial openings 52, the brushes 51 being so positioned that they will engage the central portion of the external or cylindrical face 56 of a commutator 57 which is mounted on the extended end 58 of the shaft 11 within the brush support 50. Contacts 60 in the form of longitudinal bars are placed in longitudinal slots 61 in the periphery of the commutator 57, and the ends of such bars are connected to rings 62 and 63 situated at the ends of the commutator 57. In an opening 64 radially formed in the brush support 50 is a brush 65 which is held in engagement with the ring 62 by means of a spring 66 which is forced inwardly by a screw 67 threaded into a metal ring 68 mounted in the outer end of the opening 64. The ring 63 thus serves as a collector ring for connecting the contacts or bars 60 into an electric circuit.

Extending upwardly from the ring 45 is an arm 70 having a handle 71 and a pointer 72 adapted to traverse a graduated plate 73 secured to the casing member 16 by means of screws 74 which extend into lugs or brackets projecting from the wall portion 24a, as shown in Fig. 2. In the lower portion 76 of the plate 73 is an arcuate slot 77 through which a screw 78 having a nut 79 on its inner end is extended for the purpose of securing the handle in a desired position of adjustment relative to the scale of the plate 73. By moving the arm 70, the ring 45 and the brush holder 50 may be rotated rightwardly or leftwardly so as to change the position of the brushes 51 relative to the electromagnets, as clearly shown in the electrical diagram Fig. 4.

In the present form of the invention five electromagnets are employed, these electromagnets being respectively referred to as 35a to 35e. The five brushes 51 are specifically referred to as 51a to 51e, and by the use of conductors 80 each of the brushes is connected to one terminal of a correspondingly positioned electromagnet 35a. The opposite terminal of each electromagnet 35 is connected to a battery or other source of electrical energy 81 by a conductor 82 which may have a switch 83 therein. The battery 81 is connected to the brush 65 through a conductor 84, thereby energizing the contacts 60 which are connected to the collector ring 63. The number of contacts 60 is greater than the number of brushes 51 and electromagnets 35. Accordingly, I have shown seven contacts 60 which will be hereinafter referred to specifically as 60a to 60g. Means for connecting the conductors 80, 82, and 84 to respective motor parts are shown in the form of terminal clips 86. The number of armature bars 33 is preferably the same as the number of contacts 60; therefore, I have in Fig. 4 shown seven bars 33 specifically referred to as 33a to 33g. The bars 33 are preferably mounted in the same respective radial plane as the contacts 60.

Figure 1:
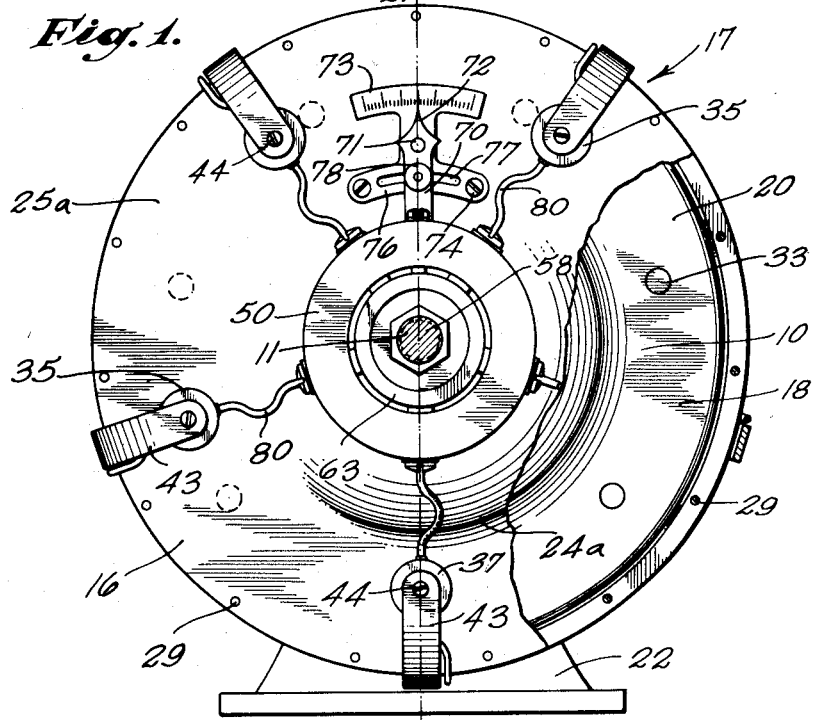
Fig. 1 is a front elevational view of a simple embodiment of my invention.

When the lever 70 is in the central position shown in Fig. 1, the brushes 51 are in such positions relative to the contacts 60 that the magnets 35 will not move the armatures 33, but by movement of the lever 70 to the right or left of the central position in which it is shown in Fig. 1, the brushes 60 may be moved into such positions relative to the electromagnets 35 that the bars 33 will be attracted and the rotor 10 consequently turned to the right or left, depending upon the direction the lever 70 is moved from its central position. The order of engagement of the contacts 60 with the brushes 51 will be understood from Fig. 4 in which the rotary member 10 is shown in such position that the contact 60a is centralized and in engagement with the brush 51a at the time the bar 33a is adjacent the electromagnet 35a, with the result that through a conductor 80 the electromagnet 35a is energized and creates a magnetic pull to move the bar 33a in clockwise direction. At this time the bar 33d is centralized with respect to the electromagnet 35c, but the contact 60d has just left engagement with the brush 51c. The contact 60e has just entered into engagement with the brush 51d, and therefore the electromagnet 35d will exert a clockwise pull on the bar 33e. Before the contact 60e has moved entirely across the brush 51d, the contact 60b will have entered into engagement with the brush 51b so as to energize the electromagnet 35b and exert a clockwise pull on the bar 33b which by that time will have been moved by the rotor 10 into a position proximate to the electromagnet 35b. Accordingly, the electromagnets 35 are energized in a prescribed order as the bars 33 approach the respective electromagnets 35, with the result that the attraction of the bars 33 by the electromagnets 35b will maintain the rotor 10 in continuous rotation.

A quantity of oil is placed in the casing 17, preferably filling the interior of the casing 17 to the level indicated by the line A—A. As the web 18 rotates, it acts centrifugally to move the oil outwardly into all parts of the thin space B between the faces 21 and 20 of the web 18 and the faces 26 and 26a of the walls 25 and 25a, thereby filling the gaps or spaces between the ends of the bars 33 and the cores 38 with oil and displacing therefrom the diamagnetic air and replacing such air with oil which is of greater paramagnetic character than the air which has been replaced. In this manner the nearest possible approach to a completely closed magnetic circuit is obtained.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. A magnetic turbine of the character described, including: a rotor having a radially extending web of diamagnetic material thereon; a shaft on which said rotor is mounted; a plurality of armature bars extending through said web with the ends thereof exposed and lying in the planes of the faces of said web; a casing enclosing said rotor and having walls extending along and in close proximity to the sides of said web, there being bearings associated with said casing for rotatably supporting said rotor; a plurality of electromagnets mounted on said casing with the cores thereof projecting through the walls of said casing and having the inner ends thereof exposed in planes situated in close proximity to the planes of the ends of said armature bars whereby to form gaps between the ends of said armature bars and the faces of said cores, the number of said armature bars being greater than the number of said electromagnets; a body of oil in said casing of such size that portions of said oil will be carried into said gaps by rotation of said rotor so as to exclude air therefrom; circuit means for feeding electric current to said electromagnets; a commutator on said shaft operating in timed relation to said rotor for controlling the flow of such electric current to said electromagnets; a plurality of brushes cooperating with said commutator each of which is connected to one of said electromagnets; means for holding said brushes in circular arrangement; a rotary element associated with said commutator and having a plurality of circularly spaced contacts thereon adapted to consecutively engage said brushes when said rotary element is rotated by said rotor, the number of said contacts being greater than the number of said brushes; and means for connecting said contacts in circuit, said brush-holding means being rotatable for the purpose of adjusting the positions of said brushes relative to said electromagnets, there being means for holding said brush-holding means in a desired position of adjustment relative to said electromagnets.

2. A magnetic turbine of the character described, including: a rotor having a radially extending web of diamagnetic material thereon; a shaft on which said rotor is mounted; a plurality of armature bars extending through said web with the ends thereof exposed and lying in the planes of the faces of said web; a casing enclosing said rotor and having walls extending along and in close proximity to the sides of said web, there being bearings associated with said casing for rotatably supporting said rotor; a plurality of electromagnets mounted on said casing with the cores thereof projecting through the walls of said casing and having the inner ends thereof exposed in planes situated in close proximity to the planes of the ends of said armature bars whereby to form gaps between the ends of said armature bars and the faces of said cores; a body of oil in said casing of such size that portions of said oil will be carried into said gaps by rotation of said rotor so as to exclude air therefrom; circuit means for feeding electric current to said electromagnets; a commutator on said shaft operating in timed relation to said rotor for controlling the flow of such electric current to said electromagnets; a plurality of brushes cooperating with said commutator and being connected to said electromagnets; means for holding said brushes in circular arrangement; a rotary element associated with said commutator and having a plurality of circularly spaced contacts thereon adapted to consecutively engage said brushes when said rotary element is rotated by said rotor; and means for connecting said contacts in said circuit, said brush-holding means being rotatable for the purpose of adjusting the positions of said brushes relative to said electromagnets, there being means for holding said brush-holding means in a desired position of adjustment relative to said electromagnets.

3. A magnetic turbine of the character described, including: a rotor having a radially extending web of diamagnetic material thereon; a shaft on which said rotor is mounted; a plurality of armature bars extending through said web with the ends thereof exposed and lying in the planes of the faces of said web; a casing enclosing said rotor and having walls extending along and in close proximity to the sides of said web, there being bearings associated with said casing for rotatably supporting said rotor; a plurality of electromagnets mounted on said casing with the cores thereof projecting through the walls of said casing and having the inner ends thereof exposed in planes situated in close proximity to the planes of the ends of said armature bars whereby to form gaps between the ends of said armature bars and the faces of said cores; a body of oil in said casing of such size that portions of said oil will be carried into said gaps by rotation of said rotor so as to exclude air therefrom; circuit means for feeding electric current to said electromagnets; a commutator on said shaft operating in timed relation to said rotor for controlling the flow of such electric current to said electromagnets; a plurality of brushes cooperating with said commutator, each of which is connected to said electromagnets; means for holding said brushes in circular arrangement; a rotary element associated with said commutator and having a plurality of circularly spaced contacts thereon adapted to consecutively engage said brushes when said rotary element is rotated by said rotor; and means for connecting said contacts in said circuit.

4. A magnetic turbine of the character described, including: a rotor having a radially extending web of diamagnetic material thereon; a plurality of armature bars extending through said web with the ends thereof exposed and lying in the planes of the faces of said web; a casing enclosing said rotor and having walls extending along and in close proximity to the sides of said web, there being bearings associated with said casing for rotatably supporting said rotor; a plurality of electromagnets mounted on said casing with the cores thereof projecting through the walls of said casing and having the inner ends thereof exposed in planes situated in close proximity to the planes of the ends of said armature bars whereby to form gaps between the ends of said armature bars and the faces of said cores; a body of oil in said casing of such size that portions of said oil will be carried into said gaps by rotation of said rotor so as to exclude air therefrom; circuit means for feeding electric current to said electromagnets; and a commutator operating in timed relation to said rotor for controlling the flow of such electric current to said electromagnets.

5. A magnetic turbine of the character described, including: a rotor having a radial flange of diamagnetic material; means for rotatably supporting said rotor; a plurality of armature bars mounted in circular arrangement in said flange of said rotor with the ends thereof exposed; a plurality of electromagnets disposed on said circle in positions to cooperate with said armature bars, each of said electromagnets having positive and negative pole faces adapted to cooperate with the opposite ends of said armature bars and a magnetic field member extending from one side to the other of said flange and across the periphery thereof; circuit means for feeding electric current to said electromagnets; a commutator operating in timed relation to said rotor for controlling the flow of such electric current to said electromagnets; and a casing surrounding said rotor and having walls in close proximity to the exposed faces of said armatures and being adapted to hold a body of oil in such position that portions of such oil will be carried by said rotor into the gaps between said armatures and said electromagnets to exclude air therefrom during the operation of the magnetic turbine.

6. A magnetic turbine of the character described, including: a rotor; means for rotatably supporting said rotary member; a plurality of armatures mounted in a circle on said rotor; a plurality of electromagnets disposed on said circle in positions to cooperate with said armatures; circuit means for feeding electric current to said electromagnets; a commutator operating in timed relation to said rotor for controlling the flow of such electric current to said electromagnets; and a casing surrounding said rotor and having walls in close proximity to the exposed faces of said armatures and being adapted to hold a body of oil in such position that portions of such oil will be carried by said rotor into the gaps between said armatures and said electromagnets to exclude air therefrom during the operation of the magnetic turbine.

7. A magnetic turbine of the character described, including: a rotor of diamagnetic material; means for rotatably supporting said rotor; a plurality of armature bars mounted in circular arrangement on said rotor with the ends thereof exposed; a plurality of electromagnets disposed on said circle in positions to cooperate with said armature bars, each of said electromagnets having positive and negative pole faces adapted to cooperate with the opposite ends of said armature bars; circuit means for feeding electric current to said electromagnets; a commutator operating in timed relation to said rotor for controlling the flow of such electric current to said electromagnets; and means for holding oil in the gaps between the ends of said bars and the pole faces of said electromagnets to exclude air therefrom during the operation of the magnetic turbine.

8. A magnetic turbine of the character described, including: a rotor having a radial flange of diamagnetic material; means for rotatably supporting said rotor; a plurality of armature bars mounted in circular arrangement in said flange of said rotor with the ends thereof exposed; a plurality of electromagnets disposed on said circle in positions to cooperate with said armature bars, each of said electromagnets having positive and negative pole faces adapted to cooperate with the opposite ends of said armature bars and a magnetic field member extending from one side to the other of said flange and across the periphery thereof; circuit means for feeding electric current to said electromagnets; and a commutator operating in timed relation to said rotor for controlling the flow of such electric current to said electromagnets.

9. A magnetic turbine of the character described, including: a rotor; means for rotatably supporting said rotor; a plurality of armatures mounted in a circle on said rotor; a plurality of electromagnets disposed on said circle in positions to cooperate with said armatures; circuit means for feeding electric current to said electromagnets; a commutator operating in timed relation to said rotor for controlling the flow of such electric current to said electromagnets; and means for holding oil in the gaps between said electromagnets and said armatures for excluding air therefrom.

10. A magnetic turbine of the character described, including: a rotor having a radially extending web of diamagnetic material thereon; a casing enclosing said rotor and web; a shaft extending through said casing for mounting said rotor therein; a plurality of armature bars extending through said web and having the ends thereof exposed and lying in the plane of the faces of said web; bearing means associated with said casing for rotatably supporting said shaft in said casing; a plurality of electromagnets mounted on said casing with the cores thereof projecting through the walls of said casing and having the inner ends thereof exposed in planes situated in close proximity to the planes of the ends of said armature bars so as to form gaps between the ends of said armature bars and the faces of said cores; a body of oil in said casing adapted to be carried into said gaps by rotation of said rotor for excluding air therefrom; circuit means for supplying electric current to said electromagnets; and a commutator on said shaft for controlling the flow of such current to said electromagnets.

11. A magnetic turbine of the character described, including: a casing; a shaft extending through said casing; bearing means on said casing for supporting said shaft thereon; a rotor mounted on said shaft to rotate in said casing; a plurality of armature bars disposed in circular arrangement on said rotor with the ends thereof exposed; a plurality of electromagnets disposed on said casing in position to cooperate with said armature bars, each of said electromagnets having positive and negative pole faces adapted to cooperate with the opposite ends of said armature bars; circuit means for supplying electric current to said electromagnets; a commutator on an end of said shaft outside of said casing, said commutator operating in timed relation to said rotor for controlling the flow of the electric current to said electromagnets; a plurality of brushes cooperating with said commutator and being connected to said electromagnets; means for holding said brushes on said commutator; a rotary element associated with said commutator and having a plurality of circularly spaced contacts thereon adapted to consecutively engage said brushes when said rotary element is rotated; means for connecting said contacts in said circuit; and fluid means in said casing for bridging the gaps between the ends of said bars and the pole faces of said electromagnets whereby to exclude air therefrom during the operation of said rotor.

JOHAN W. POYSA.